United States Patent Office 3,244,672
Patented Apr. 5, 1966

---

3,244,672
α,β-UNSATURATED ETHER STABILIZED POLY-OXYMETHYLENES AND A PROCESS FOR PREPARING THE SAME
Hans Dieter Hermann, Klaus Weissermel, and Edgar Fischer, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 3, 1961, Ser. No. 93,041
Claims priority, application Germany, Mar. 4, 1960, F 30,681; Dec. 22, 1960, F 32,822, F 32,823
13 Claims. (Cl. 260—67)

The present invention relates to stabilized polyoxymethylenes and to a process for preparing same.

It is known that high molecular polyoxymethylene prepared, for example, by polymerizing gaseous formaldehyde in an inert reaction medium and intended for the manufacture of stable films, fibers and shaped bodies must be subjected to various stabilization processes. In principle the following stabilization processes are concerned:

(1) Stabilization by reacting the terminal hydroxy groups of the polymer.
(2) Improvement of the thermal stability of the polymer by adding heat stabilizers, for example hydrazine or urea derivatives or polyamides.
(3) Improvement of the stability of the polymer to oxidation, for example by adding phenols or sulfur compounds.
(4) Improvement of the stability of the polymer to the action of light, for example by adding hydroxybenzophenones.

In order to produce from high molecular polyoxymethylenes fibers, foils or shaped bodies that are stable to use, it is absolutely necessary to carry out the aforementioned stabilization processes.

The present invention is concerned with the stabilization of polymeric formaldehyde by reacting the terminal hydroxy groups thereof. H. Staudinger has already established that polyoxymethylenes which contain terminal hydroxy groups have the tendency to split off formaldehyde at the end of the chain. Consequently, said polymers intensely smell of formaldehyde. According to H. Staudinger it is possible, however, to esterify or etherify the terminal groups and so to prevent the macromolecules from decomposing at the end of the chain. When high molecular polyoxymethylenes that are suitable for being worked up are esterified or etherified considerable difficulties are encountered. In the etherification, carried out for example with dimethyl formal, relatively large amounts of strongly acid catalysts are required, which have the tendency in the reaction to reduce the molecular weight of the polymers, only give very poor yields of polyoxymethylene ethers and must be quantitatively removed from the polymers after the reaction.

The esterification can be carried out with good yields in the presence of alkaline catalysts with acetic anhydride, but in this case, too, it is necessary to remove after the reaction the excess acetic anhydride from the polymer except for minimum traces.

It has now been found that polyoxymethylenes which contain terminal hydroxy groups and decompose at 220° C. within 30 minutes under nitrogen to less than 80% can be stabilized by reacting them with one or several α-β-unsaturated ethers, preferably in the presence of cationic catalysts.

Suitable ethers have the following structures:

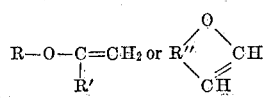

wherein R stands for a monovalent radical of a saturated aliphatic hydrocarbon, such as the methyl, ethyl, butyl dodecyl, or octadecyl radical; a monovalent radical of an aromatic hydrocarbon, such as the phenyl, naphthyl or tolyl radical; or a monovalent radical of a cycloaliphatic hydrocarbon, such as the cyclohexyl radical, the radicals mentioned possibly containing substituents, for example halogen atoms or alkyl, nitro, ether, acetal, ester, nitrilo or amido groups; R' represents a hydrogen radical; a monovalent radical of a saturated aliphatic hydrocarbon, such as the methyl, ethyl, butyl, dodecyl or octadecyl radical; a monovalent radical of an aromatic hydrocarbon, such as the phenyl, naphthyl or tolyl radical; or a monovalent radical of a cycloaliphatic hydrocarbon, such as the cyclohexyl radical, the radicals mentioned possibly containing substituents, for example halogen atoms, alkyl, nitro, ether, acetal, ester, nitrilo or amido groups; and R'' stands for an alkylene radical containing 2 to 4 carbon atoms.

From among the aforementioned α-β-unsaturated ethers there are especially suitable vinyl ethers of the formula

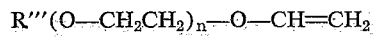

wherein R''' represents a monovalent radical of an aromatic hydrocarbon, such as the phenyl or naphthyl radical which may be substituted, for example, with alkyl, alkoxy or acyloyl groups and n stands for a whole number preferably in the range of from 1 to 100.

There are especially mentioned by way of example vinyl ethers in which n stands for 1 and the radical R''' does not carry a substituent, such as the phenoxyethyl-vinyl ether, the α- or β-naphthoxyethyl-vinyl ether; furthermore, vinyl ethers in which the radical R''' carries substituents, for example the 4-methyl-, 3-methyl-, 2,6-dimethyl-, 2-aceto-, 4-ethoxy-, 4-methoxy-, 2-phenyl-phenoxyethyl-vinyl ether; and corresponding ethers in which n stands for a whole number in the range from 2 to 20.

Other suitable vinyl ethers are, for example, vinylmethyl ether, vinylethyl ether, vinylbutyl ether, vinylisobutyl ether, vinyldodecyl ether, vinyloctadecyl ether and vinyl-β-chloroethyl ether; vinylphenyl ether, 4-methoxybutylvinyl, ethylene-glycol methylvinyl ether, vinyl-4-isohexylphenyl ether; cyclic α-β-unsaturated ethers such as dihydrofurane and dihydropyrane or the corresponding alkyl-or arylvinyl ethers carrying as substituent in α-position of the vinyl group the radical R', which stands for example for a methyl, ethyl, dodecyl, phenyl or naphthyl radical.

Furthermore, there can be used α-β-unsaturated ethers that are substituted in β-position, preferably by an alkyl radical such as a methyl, ethyl or octadecyl radical.

The aforementioned vinyl ethers can be readily prepared by known methods.

The process of the invention is especially suitable for stabilizing polyoxymethylenes having a reduced viscosity of more than 0.3 determined with a 0.5% solution of the polymer in butyrolactone at 140° C. in the presence of 2% of diphenyl amine, calculated on the butyrolactone. The substituted polymer is obtained with good yields. In many cases, it is not necessary subsequently to wash and dry the polymer.

Without limiting the scope of the invention it can be assumed that a vinyl ether reacts with polyoxymethylenes according to the following formula:

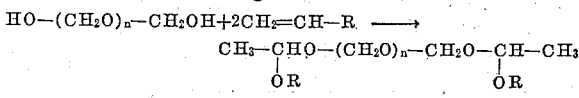

wherein R has the meaning given above.

The polyoxymethylenes may also be reacted with $\alpha$-$\beta$-unsaturated ethers in the absence of a catalyst, but in most cases it is recommended to use a cationic catalyst, for example a strong inorganic acid, such as sulfuric acid and hydrogen chloride. Better catalysts are, however, inorganic and organic acid halides, such as thionyl chloride, phosphorus trichloride, phosphorus oxychloride, and acetyl chloride; furthermore anhydrous halides of the elements aluminum, iron, tin, titanium, antimony, beryllium, boron; complex compounds of the aforesaid halides, and other Lewis acids. Especially active is boron trifluoride.

Excellent catalysts are also the salts of hydrofluoboric acid, preferably the alkaline earth metal and alkali metal salts thereof, and salt-like compounds of ammonia, amides, amines and nitrogen-containing heterocyclic compounds with hydrofluoboric acid.

The salts of hydrofluoboric acid are especially distinguished by the fact that they considerably accelerate the addition reaction of $\alpha$-$\beta$-unsaturated ethers on hydroxy groups while, in contradistinction to the action of other cationically active catalysts such as acids or Lewis acids, they provoke no or only slight splitting of acetal linkages.

From among the large number of said catalysts there are especially mentioned the salt-like compounds of hydrofluoboric acid with (1) ammonia and aliphatic or cycloaliphatic amines such as methyl-, ethyl-, propyl-, stearyl-, dimethyl-, methyl- stearyl-, trimethyl-, tributyl-, cyclohexyl-, or dicyclohexylamine;

(2) aromatic amines such as aniline, diphenyl amine, methylaniline, dimethyl-aniline, benzidine, p-phenylene diamine, N,N'-tetramethyl-p-phenylene diamine, phenyl-$\beta$-naphthyl amine;

(3) nitrogen-containing heterocyclic compounds, such as pyrrolidine, morpholine, pyridine, polyvinyl pyrrolidone, pyrrolidone;

(4) amides such as acetamide, benzoic acid amide, malonic acid diamide, adipic acid diamide, citric acid triamide.

There are furthermore well suitable as catalysts the lithium, potassium, sodium, magnesium, strontium and barium salts of hydrofluoboric acid.

The amount of catalyst used may vary between 0.0001 and 2% by weight and preferably 0.001 and 0.1% by weight, calculated on the polymer.

The catalyst can be mixed with the polymer by any known method. If possible the mixture obtained shall be as homogeneous as possible. Following mixing methods can be applied: mechanical mixing, application of the catalyst from a solution, (especially advantageous), addition of the catalyst in the form of a solution in the ether used for stabilizing the polymer, kneading of the catalyst into the molten polymer prior to the addition of the ether.

The amounts of $\alpha$-$\beta$-unsaturated ethers, especially vinyl ethers, used for stabilizing the polymer can be varied within wide limits. The ether can be used, for example in 0.001 to 10 times the amount by weight of the polymer.

Higher concentrations may likewise be used, but they are mostly unsuitable for economical reasons. In general, the ether is used in 0.01 to 3 times the amount by weight of the polymer.

The reaction is carried out at a temperature in the range from about 50° C. to about 220° C. and preferably from 100° C. to 200° C. In some cases, it is of advantage to operate at the boiling temperature of the ether used if this temperature is within the indicated range.

When the indicated conditions are observed the process of the invention can be carried out in any manner. In most cases, it is suitable to bring about the reaction in a homogeneous phase, but it may also be of advantage to conduct the reaction in heterogeneous phase while the reaction medium is kept in motion by mechanical means. It is likewise possible to perform the reaction in a solution of the polymer in the ether used. In this case, an additional inert auxiliary solvent may be used.

The reaction takes place when the finely divided polymer is suspended in the $\alpha$-$\beta$-unsaturated ether in undissolved, swollen or molten state. In this case, too, an inert auxiliary liquid may be used for diluting the reaction medium, for example an aromatic or aliphatic hydrocarbon.

Particularly favorable is the stabilization in the melt of the polymer at a temperature above 170° C. In this case, the $\alpha,\beta$-unsaturated ether can also be used in the gaseous phase with the application of pressure. Pressure should also be applied when the temperature of dissolution of the polymer in the $\alpha,\beta$-unsaturated ether used is above the boiling temperature of the ether at atmospheric pressure.

The duration of the reaction likewise varies within large limits. The reaction at a temperature above 150° C. in homogeneous phase will be completed after 5 minutes while a reaction in heterogeneous phase at a temperature below 100° C. may take up to 5 hours.

If possible, the reaction should be carried out with the exclusion of atmospheric oxygen and humidity.

By the process of the invention there can be stabilized all polyoxymethylenes having terminal hydroxy groups and which lose less than 80% of their weight when heated for 30 minutes under nitrogen at 220° C. By polyoxymethylenes there are understood in the specification and in the claims polymers obtained by polymerizing gaseous or liquid formaldehyde, or by polymerizing trioxane or by copolymerizing formaldehyde with, for example, trifluoroacetaldehyde, or by copolymerizing trioxane with, for example, cyclic acetals, in the copolymers the amount of formaldehyde or trioxane structural units, respectively, being at least 50% by weight calculated on the copolymer. One of the advantages of the process of the invention resides in the fact that in many cases the polymer need not be washed out and dried after the reaction, especially if the reaction is carried out in the absence of a catalyst or with small amounts of catalyst only and if the reaction is carried out in the melt. The reaction being terminated, it may only be necessary to remove an excess of $\alpha$-$\beta$-unsaturated ethers, for example under reduced pressure. When the reaction is carried out, however, in heterogeneous phase in the presence of larger amounts of $\alpha,\beta$-unsaturated ethers and catalysts, it may be of advantage to purify the polymer after cooling and filtering by washing it with an organic solvent, such as ketones, ethers, esters, hydrocarbons, halogenated hydrocarbons or alcohols or even with water. It is suitable to dry the polymer under reduced pressure at a temperature in the range from 60° C. to 80° C.

The polymers, the terminal groups of which have been stabilized by the process of the invention, can be further stabilized by incorporating into said polymers heat stabilizers and/or stabilizers to oxidation and/or stabilizers to light by any known method. If the stabilizers used are inert toward $\alpha,\beta$-unsaturated ethers and cationic catalysts, they can be mixed with the polymer either during the reaction or immediately after the reaction. The polymers which have been stabilized by the process of the invention can be used for the manufacture of fibers, foils and films and for making tubes, profiles and injection molded articles, especially if they have further been stabilized against heat, oxidation and light.

The following examples serve to illustrate the invention but they are not intended to limit it thereto, the parts being by weight unless otherwise stated.

*Example 1*

In a closed kneader 50 parts of polymeric trioxane were kneaded for 20 minutes with the exclusion of air with 10 parts of phenyl-vinyl ether and 0.015 part of boron trifluoride, while the temperature was maintained at 200° C. After the removal of the vinyl ether in excess under reduced pressure at 200° C., a polymer was obtained without further working up which decomposed by 27% when heated for 30 minutes at 220° C. under nitrogen, while the starting product which was free from boron trifluoride underwent, under the same conditions, a loss in weight of 38%. Without further stabilization against heat, oxidation and light tough foils which were free from bubbles could be made from the polymer.

In contradistinction thereto the same polymer mixed with the same amount of boron trifluoride but not with vinyl ether decomposed to a considerable extent when kneaded for 20 minutes at 200° C., a brittle polymer being obtained.

*Example 2*

80 parts of polyformaldehyde containing 0.0025 part of boron trifluoride were suspended while stirring for one hour at 160° C. under nitrogen in 400 parts of vinyl-octadecyl ether. After having been cooled to 50° C., the polymer was filtered off with suction, washed with acetone and then with water. After drying at 70° C. under reduced pressure, 76 parts of a polymer were obtained, 28% of which decomposed under nitrogen when the polymer was heated for 30 minutes at 220° C. When the starting product was heated under the same conditions it decomposed by 51%.

*Example 3*

20 parts of polymeric trioxane having a reduced viscosity of 1.32, determined with a 0.5% polymer solution in butyrolactone at 140° C. in the presence of 2% of diphenyl amine, were heated in a closed autoclave under nitrogen and while vigorously stirring for 2 hours at 150° C. with 0.005 part of thionyl chloride and 100 parts of vinyl-isobutyl ether. After having worked up the mixture, 19.6 parts of a stable polymer were obtained having a reduced viscosity of 1.13.

*Example 4*

40 parts of a polymeric trioxane, which underwent a loss in weight of 37.5% when heated for 30 minutes at 220° C., were heated in a stirring autoclave for 2 hours at 160° C. with 100 parts of phenyl-vinyl ether and 0.1 part of acetyl chloride as catalyst. The reaction was carried out with the exclusion of oxygen and atmospheric moisture. After having been cooled, filtered off with suction and washed with acetone and water, the polymer was dried at 80° C. under reduced pressure. A product was obtained in a yield of 95%, 17% of which decomposed when the polymer was heated under nitrogen for 30 minutes at 220° C.

*Example 5*

80 parts of polymeric trioxane which contained 0.025 part of boron trifluoride were dissolved in a stirring autoclave in 300 parts of β-chlorethyl-vinyl ether and maintained in solution for 30 minutes. After having worked up as described in Example 4, a polymer having stabilized terminal groups was obtained in a yield of 94%, and which, after having been stabilized with a polyamide, decomposed by less than 5% when heated for 30 minutes at 220° C. under nitrogen.

*Example 6*

50 parts of polymeric formaldehyde were kneaded in a closed kneader for 20 minutes at 200° C. with 5 parts of phenylvinyl ether and 0.0015 part of boron trifluoride. By this measure the stability of the polymer was improved from a 50% decomposition within 30 minutes at 200° C. under nitrogen to a 32% decomposition under the same conditions.

*Example 7*

Each time 50 parts of polymeric trioxane, which decomposed by 44% when heated for 30 minutes at 220° C. under nitrogen, were mixed with the exclusion of air with 0.008 part of boron trifluoride and then kneaded for 20 minutes at 200° C. in a nitrogen atmosphere with 5 parts each of the vinyl ethers mentioned in the following table. Subsequently the loss in weight of the samples was determined by heating them for 30 minutes at 220° C. under nitrogen. The results are given in the following table:

TABLE

| Vinyl ether | Loss in weight percent, 30 minutes 220° C. under $N_2$ | Appearance of sample, 20 min. 220° C. under $N_2$ |
|---|---|---|
| Phenoxyethylvinyl ether | 44 | Strongly blistered. |
| β-naphthoxyethylvinyl ether | 35 | Without blisters. |
| 2-methylphenoxyethylvinyl ether | 29 | Do. |
| 2-acetophenoxyethylvinyl ether | 42 | Feebly blistered. |
| 4-ethoxyphenoxyvinyl ether | 39 | Without blisters. |
| Phenylvinyl diglycol | 27 | Feebly blistered. |
| Xylenylvinyl glycol | 29 | Without blisters. |
|  | 31 | Feebly blistered. |
|  | 23 | Without blisters. |

*Example 8*

A high molecular polyoxymethylene containing terminal hydroxy groups was intensely mixed with 10% by weight of phenoxyethylvinyl ether and 0.04% by weight of ammonium fluoborate. From the mixture a 2 mm. thick tough strand was produced by extrusion at 190–200° C., which strand was completely free from blisters.

*Example 9*

Each time 50 parts of polymeric trioxane, which decomposed by 56% when heated for 30 minutes at 220° C. under ntirogen, were mixed with a solution of 0.02 part of the catalysts indicated in the following table in 100 parts of purest methanol. The methanol was then distilled off in a rotary evaporator. The polymer thus treated was then kneaded for 20 minutes at 200° C. under nitrogen with 10 parts of the vinyl ether mentioned below. Subsequently the loss in weight of the samples was determined by heating them for 30 minutes at 220° C. under nitrogen. The results obtained are given in the following table:

TABLE

| Catalyst | Vinyl ether | Loss in weight percent, 30 minutes 220° under N₂ |
|---|---|---|
| LiBF₄ | β-Naphthoxy-ethylvinyl ether. | 56 |
|  | do | 33 |
| Ba(BF₄)₂ | do | 42 |
| LiBF₄ | Phenoxyethyl-vinyl ether. | 35 |
| Ba(BF₄)₂ | do | 34 |
| NH₄BF₄ | do | 22 |
| Malonic acid diamide·2HBF₄ | do | 32 |
| Diphenyl amine·HBF₄ | do | 25 |
| Dimethyl amine·HBF₄ | do | 14 |
| Phenyl-β-naphthyl amine·HBF₄ | do | 34 |
| Morpholine·HBF₄ | do | 20 |
| Pyrrolidine·HBF₄ | do | 25 |
| Pyridine·HBF₄ | do | 22 |
| Pyrrolidone·HBF₄ | do | 27 |
| Polyvinyl pyrrolidone·HBF₄ | do | 24 |

We claim:

1. A process for stabilizing polyoxymethylene which comprises reacting one part of a polyoxymethylene decomposing at 220° C. within 30 minutes under nitrogen to less than 80% with 0.001 to 10 parts by weight of an α,β-unsaturated ether selected from the group consisting of compounds of the formula

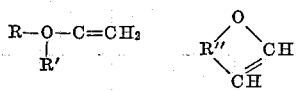 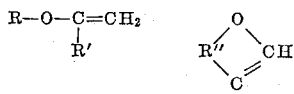

and R'''(O—CH₂—CH₂)ₙ—O—CH=CH₂ wherein R stands for a member selected from the group consisting of monovalent unsubstituted saturated aliphatic hydrocarbons of up to 18 carbon atoms, phenyl, naphthyl, monovalent unsubstituted cycloaliphatic hydrocarbons of up to 6 carbon atoms and said members substituted by a member selected from the group consisting of lower alkyl, lower alkoxy, lower acyl, lower carboxy, nitro, nitrilo and amido radicals, R' stands for a member selected from the group consisting of hydrogen, monovalent unsubstituted saturated aliphatic hydrocarbons of up to 18 carbon atoms, phenyl, naphthyl, monovalent unsubstituted cycloaliphatic hydrocarbons of up to 6 carbon atoms and except hydrogen said members substituted by a member selected from the group consisting of lower alkyl, lower alkoxy, lower acyl, lower carboxy, nitro, nitrilo and amido radicals, R'' stands for an alkylene radical of 2 to 4 carbon atoms, R''' stands for a member selected from the group consisting of phenyl and naphthyl and said members substituted by a member selected from the group consisting of lower alkyl, lower alkoxy and lower acyl radicals, and n stands for a whole number from 1 to 100, at a temperature within the range of 50° C. to 220° C.

2. A process as defined in claim 1 wherein said polyoxymethylene and said ether are reacted at a temperature in the range of 100° C. to 200° C.

3. A process as defined in claim 1, which comprises carrying out the reaction with a vinyl ether of the formula R'—O'—CH=CH₂.

4. A process as defined in claim 1, which comprises carrying out the reaction with β-chloroethyl-vinyl ether.

5. A process as defined in claim 1, which comprises carrying out the reaction with phenylvinyl ether.

6. A process as defined in claim 1, which comprises carrying out the reaction in the presence of boron trifluoride.

7. A process as defined in claim 1, which comprises carrying out the reaction in the presence of a salt selected from the group consisting of alkali metal and alkaline earth metal salts of hydrofluoboric acid.

8. A process as defined in claim 1, which comprises carrying out the reaction in the presence of a compound selected from the group consisting of salts of hydrofluoboric acid with ammonia, amines, amides and nitrogen-containing heterocyclic compounds.

9. A process as defined in claim 1, which comprises carrying out the reaction in the presence of thionyl chloride.

10. A process as defined in claim 1, which comprises carrying out the reaction in the presence of acetyl chloride.

11. A process as defined in claim 1, which comprises carrying out the reaction in the presence of a member of the group consisting of inorganic and organic acid halides.

12. A process as defined in claim 1 which comprises carrying out the reaction in the presence of a member selected from the group consisting of thionyl chloride, phosphorus trichloride, phosphorus oxychloride, acetyl chloride and anhydrous halides of aluminum, iron, tin, titanium, antimony, beryllium and boron.

13. A stabilized polyoxymethylene which is the reaction product of a polyoxymethylene which decomposes at 220° C. within 30 minutes under nitrogen to less than 80% having terminal hydroxyl groups and an α,β-unsaturated ether selected from the group consisting of compounds of the formula and R'''(O—CH₂—CH₂)ₙ—O—CH=CH₂ wherein R stands for a member selected from the group consisting of monovalent unsubstituted saturated aliphatic hydrocarbons of up to 18 carbon atoms, phenyl, naphthyl, monovalent unsubstituted cycloaliphatic hydrocarbons of up to 6 carbon atoms and said members substituted by a member selected from the group consisting of lower alkyl, lower alkoxy, lower acyl, lower carboxy, nitro, nitrilo and amido radicals, R' stands for a member selected from the group consisting of hydrogen, monovalent unsubstituted saturated aliphatic hydrocarbons of up to 18 carbon atoms, phenyl, naphthyl, monovalent unsubstituted cycloaliphatic hydrocarbons of up to 6 carbon atoms and except hydrogen said members substituted by a member selected from the group consisting of lower alkyl, lower alkoxy, lower acyl, lower carboxy, nitro, nitrilo and amido radicals, R'' stands for an alkylene radical of 2 to 4 carbon atoms, R''' stands for a member selected from the group consisting of phenyl and naphthyl and said members substituted by a member selected from the group consisting of lower alkyl, lower alkoxy and lower acyl radicals, and n stands for a whole number from 1 to 100.

References Cited by the Examiner

UNITED STATES PATENTS

| | | | |
|---|---|---|---|
| 2,296,249 | 9/1942 | Austin | 260—67 |
| 2,732,370 | 1/1956 | Codding | 260—67 |
| 2,962,476 | 11/1960 | Verburg | 260—45.7 |
| 2,989,508 | 6/1961 | Hudgin et al. | 260—45.9 |
| 3,002,952 | 10/1961 | O'Connor | 260—67 |
| 3,087,913 | 4/1963 | Kray et al. | 260—67 |

FOREIGN PATENTS 848,660   9/1960   Great Britain.

OTHER REFERENCES

Kern et al.: Angewandte Chemie, 73 No. 6, pages 177–186, March 1961. Q.D.I.Z. 5.

Derwent Belgian Patents Repeert: vol. 62A, February 1960, page A22.

Vogl: Chemistry and Industry, (June 3, 1961) pages 748–749. TP 1S63.

WILLIAM H. SHORT, *Primary Examiner.*

MILTON STERMAN, *Examiner.*